United States Patent
Reynolds et al.

(10) Patent No.: US 9,643,286 B2
(45) Date of Patent: May 9, 2017

(54) METHOD OF REPAIRING A TURBINE ENGINE COMPONENT

(75) Inventors: George H. Reynolds, Sanford, ME (US); Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 3215 days.

(21) Appl. No.: 11/696,739

(22) Filed: Apr. 5, 2007

(65) Prior Publication Data
US 2009/0064500 A1 Mar. 12, 2009

(51) Int. Cl.
*B23P 6/00* (2006.01)
*F01D 25/24* (2006.01)

(52) U.S. Cl.
CPC .......... *B23P 6/005* (2013.01); *F01D 25/246* (2013.01); *F05D 2230/80* (2013.01); *Y10T 29/49318* (2015.01); *Y10T 29/49734* (2015.01); *Y10T 29/49737* (2015.01)

(58) Field of Classification Search
CPC .. B23P 6/005; F01D 25/246; F05D 2230/80; Y10T 29/49318
USPC ........... 29/889.1, 17.2, 17.3, 402.09, 402.11, 29/402.13, 402.16, 402.18, 29/402.03–402.07; 228/119
See application file for complete search history.

(56) References Cited

U.S. PATENT DOCUMENTS

| | | | |
|---|---|---|---|
| 3,994,622 A | 11/1976 | Schultz et al. | |
| 4,285,108 A | 8/1981 | Arrigoni | |
| 4,924,581 A | 5/1990 | Jakobsen | |
| 5,071,313 A | 12/1991 | Nichols | |
| 5,593,273 A | 1/1997 | Brinkman | |
| 5,749,218 A | 5/1998 | Cromer et al. | |
| 5,971,710 A | 10/1999 | Stauffer et al. | |
| 6,179,567 B1 | 1/2001 | Stauffer et al. | |
| 6,238,187 B1 * | 5/2001 | Dulaney et al. | 416/241 R |
| 6,464,128 B1 | 10/2002 | Messelling et al. | |
| 6,491,498 B1 | 12/2002 | Seleski et al. | |
| 6,499,945 B1 | 12/2002 | Lathrop | |
| 6,558,121 B2 | 5/2003 | Zhu et al. | |
| 6,701,616 B2 | 3/2004 | Smith et al. | |
| 6,908,288 B2 | 6/2005 | Jackson et al. | |
| 7,025,563 B2 | 4/2006 | Servadio et al. | |

(Continued)

FOREIGN PATENT DOCUMENTS

| | | |
|---|---|---|
| EP | 1516942 | 3/2005 |
| EP | 1563937 A2 | 8/2005 |

(Continued)

OTHER PUBLICATIONS

Examination Report, EP Application No. 08251325.0, dated Mar. 24, 2011.

(Continued)

*Primary Examiner* — Sarang Afzali
(74) *Attorney, Agent, or Firm* — Carlson, Gaskey & Olds, P.C.

(57) ABSTRACT

The inventive method involves the inspection of a turbine engine. A damaged component of the turbine engine is identified. Portions of the turbine engine component are removed from the damaged area to accommodate an overlay. The overlay is sized smaller than the turbine engine component. The overlay is then placed in a location previously occupied by the removed portion and attached to the turbine engine component.

19 Claims, 4 Drawing Sheets

(56) References Cited

U.S. PATENT DOCUMENTS

| | | | |
|---|---|---|---|
| 7,063,503 B2 | 6/2006 | Meisels | |
| 7,114,920 B2 | 10/2006 | Synnott | |
| 7,222,422 B2* | 5/2007 | Gupta et al. | 29/889.1 |
| 2004/0088988 A1 | 5/2004 | Swaffar | |
| 2005/0181231 A1* | 8/2005 | Gupta et al. | 428/668 |
| 2005/0274009 A1* | 12/2005 | Powers | B23K 1/0018 |
| | | | 29/889.1 |

FOREIGN PATENT DOCUMENTS

| EP | 1837104 | 9/2007 |
|---|---|---|
| EP | 1843010 | 10/2007 |

OTHER PUBLICATIONS

European Search Report for Application No. EP 08 25 1325 mail Jul. 18, 2008.

\* cited by examiner

METHOD OF REPAIRING A TURBINE ENGINE COMPONENT

BACKGROUND OF THE INVENTION

This invention relates to a method of repairing a turbine engine, including parts of the engine.

Parts of a turbine engine are subject to significant stress and wear. From time to time, it may become necessary to repair or replace these components. Because of their cost, repair may be preferable to the replacement of the entire component. Repair of these components may include the build-up of damaged areas to original dimensions by welding, nickel plating, plasma spraying or other restoration techniques. Further machining of these areas may be required to conform these parts to their original dimensions. Existing techniques for repairing worn parts are both time consuming and labor intensive.

Accordingly, a need exists to reduce the time and labor associated with repairing the components of a turbine engine.

SUMMARY OF THE INVENTION

The present invention concerns a method of repairing a turbine engine. During an inspection of the turbine engine, a part of the turbine engine that requires repair may be identified. Following identification of the part requiring service, portions of the part are removed in the damaged area so as to accommodate an overlay. The overlay allows the part to be reconditioned without the need to build up the damaged area. The overlay is then placed in the area where the portions of the part were removed and then attached. The overlay may be attached by brazing, welding, epoxy based resins or by other adhesive techniques.

The various features and advantages of this invention will become apparent to those skilled in the art from the following detailed description. The drawings that accompany the detailed description can be briefly described as follows.

DETAILED DESCRIPTION

Figure 1:
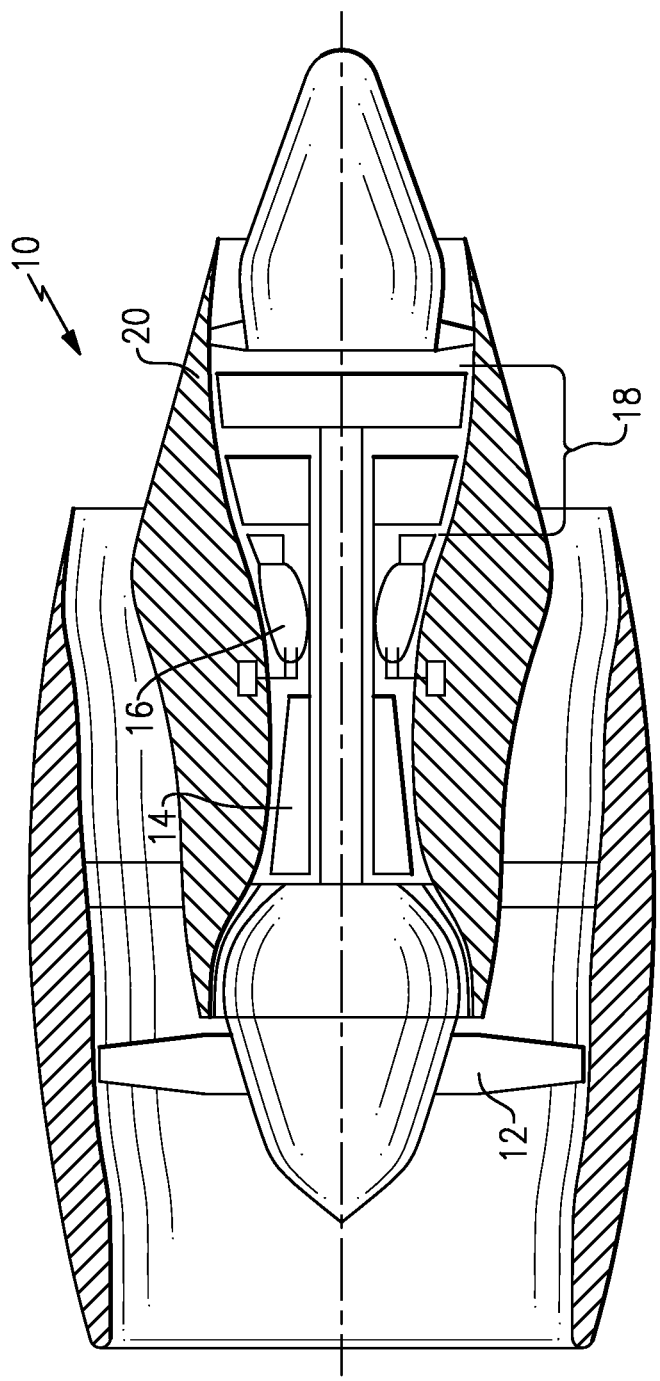
FIG. 1 illustrates a known turbine engine that would benefit from the inventive repair technique.

FIG. 1 illustrates an example of a turbine engine 10, here a turbofan engine, that would benefit from the inventive repair technique. As other types of turbine engines, such as a turbojet engine, will likewise benefit from the inventive technique, the term turbine engine is not limited to the disclosed embodiment. As shown, turbine engine 10 has a fan 12 or propeller through which ambient air is propelled. A multi-stage compressor 14 pressurizes the air and is in communication with a combustor 16 that mixes the compressed air with fuel. The combustor 16 ignites the fuel-air mixture. Expanded gas then passes through turbine section 18 as known. Surrounding turbine section 18 is a shroud 20, composed of shroud segments, such as shown in FIGS. 2A and 3A.

Figure 2A:
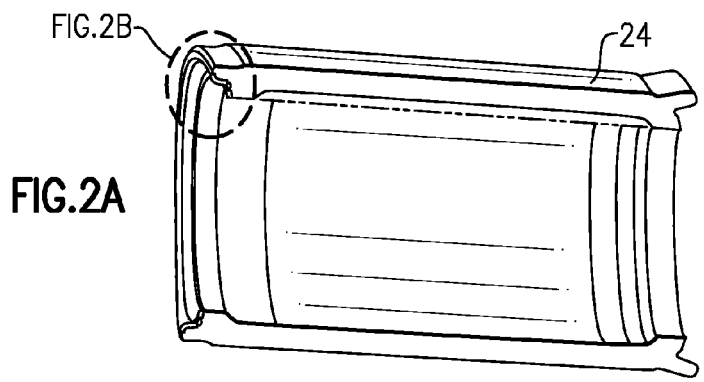
FIG. 2A illustrates a turbine engine component, here a compressor shroud segment, of the turbine engine of FIG. 1, showing areas of wear.
Figure 2B:
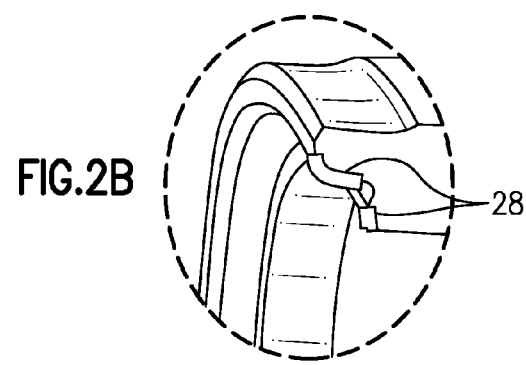
FIG. 2B shows a close-up of the areas of wear shown in FIG. 2A.
Figure 5:
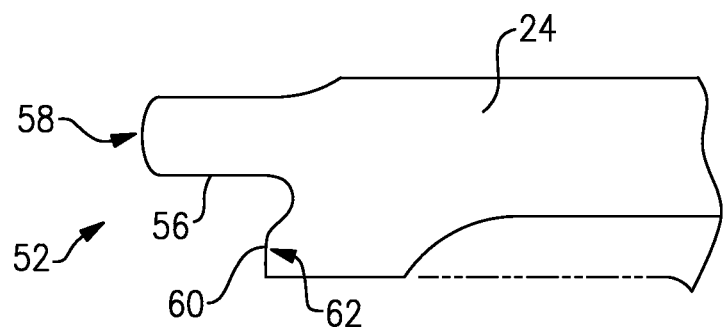
FIG. 5 illustrates a cross-sectional view of a portion of the turbine engine component without wear, showing its original shape.

As shown in FIG. 2A and FIG. 5, turbine engine component 24, here a compressor shroud segment, may have tongue 58 and face 62 to be received by a groove (not shown) formed in shroud 20 to allow turbine engine component 24 to be fitted in shroud 20, such as by a dovetail fit of the part. As shown in FIG. 5, turbine engine component 24 has original shape 52 having a first turbine engine component surface 56 and a second turbine engine component surface 60. As shown in FIG. 2B, first turbine engine component surface 56 and second turbine engine component surface 60 may become worn (shown schematically) in damaged area 28 so that turbine engine component 24 will not be secured to shroud 20 as closely as the original part.

Figure 3A:
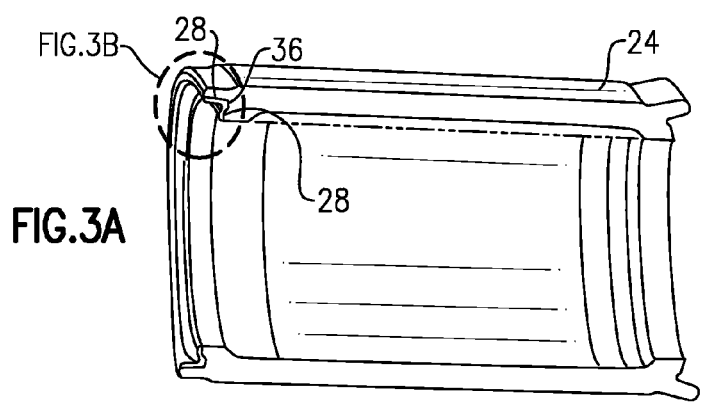
FIG. 3A illustrates the removal of portions of the turbine engine component of FIG. 2 to accommodate an overlay.
Figure 3B:
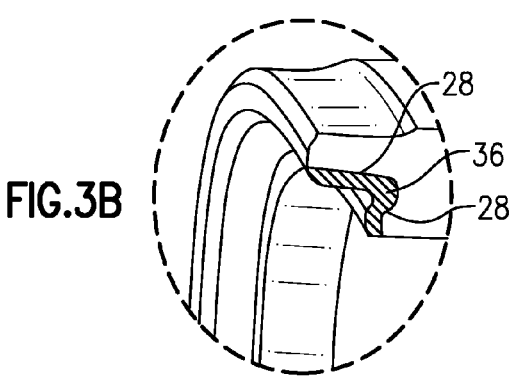
FIG. 3B shows a close-up of FIG. 3A where portions of the turbine engine component have been removed.
Figure 4A:
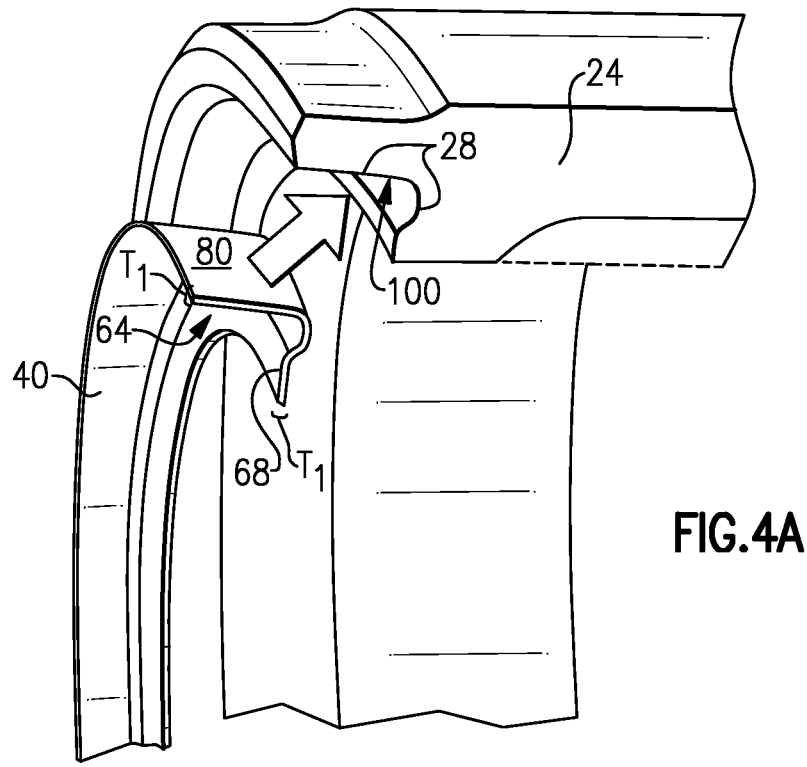
FIG. 4A illustrates an overlay in relation to the turbine engine component of FIGS. 2 and 3.
Figure 6:
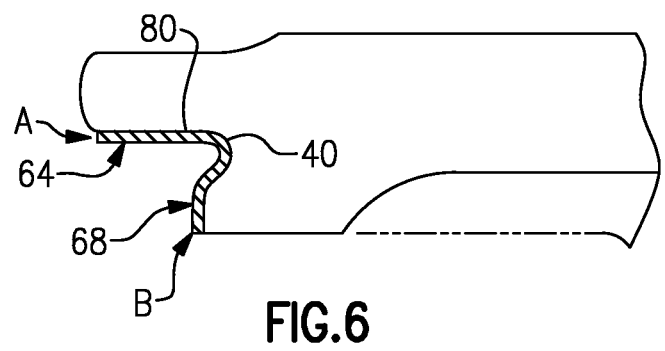
FIG. 6 illustrates the turbine engine component of FIGS. 2A and 3A, highlighting the matching of the overlay shape to the original shape of the portion of the turbine engine component of FIG. 5.

Rather than replace turbine engine component 24, the inventive technique, as shown in FIGS. 3A and 3B, eliminates portion 36 of turbine engine component 24 proximate damaged area 28 so as to accommodate overlay 40 as shown in FIGS. 4A and 6. In this way, the expense of part replacement may be eliminated and, as will be seen, significant time and labor required to build-up the worn part avoided. Overlay 40, as shown in FIG. 6, has first overlay surface 64 and second overlay surface 68. With reference to FIG. 5 and FIG. 6, it can be seen that first overlay surface 64 mimics the shape, here planar, of first turbine engine component surface 56 while second overlay surface 68 mimics second turbine engine component surface 60, here a curved and planar shape. Because a portion of overlay 40 conforms generally to original shape 52 of turbine engine component 24, overlay 40 reduces time and labor involved in repairing turbine component 24. In other words, machining and resurfacing of first overlay surface 64 and second overlay surface 68 are not required. Overlay 40 mimics areas of anticipated wear of turbo engine component 24 so that only small strips of material are used.

In addition, first overlay 40 may be made of the same material as turbine engine component 24. The materials are matched to ensure expansion coefficient of overlay 40 and turbo engine component 24 are consistent with each other. The hardness of turbine engine component 24 may be different to allow a part to wear longer, if harder, or to be more delicate to surrounding shroud 20, if softer. Overlay 40 is also provided with attachment surface 80 so that it may be placed in location 100 previously occupied by removed portion 36 proximate damaged area 28. Overlay 40 may be roll formed from sheet metal into strips.

To attach overlay 40 to turbine engine component 24, portion 36 of turbine engine component 24 may be removed, as shown in FIG. 3B, so that overlay 40 will fit onto turbine engine component 24 more easily and more closely to the original dimensions of turbine engine component 24. Portion 36 may be removed by machining, such as by turning or milling, or other known techniques. The amount of machining should be done with reference to the size of overlay 40.

As shown in FIG. 4A, overlay 40 is then position in location 100, an area formerly occupied by removed portion 36, to determine whether its fit is adequate. Further machining of damaged area 28 may be required. Once overlay 40 fits into location 100 sufficiently, overlay 40 is then welded at points A and B as shown in FIG. 6, such as by laser, electron beam, tungsten inert gas, or other known welding technique. Alternatively, overlay 40 may be brazed or glued along attachment surface 80 to attach overlay 40 to turbine engine component 24. Suitable glues/adhesives include, but are not limited to, Durabond™ 7025 high temperature aluminum putty, Durabond™ 7032 high temperature stainless putty, Duralco® 4703 structural epoxy adhesive and casting compound, or Duralco® 4701 one component toughened adhesive, all available from Cotronics Corp., Brooklyn, N.Y.

Figure 4B:
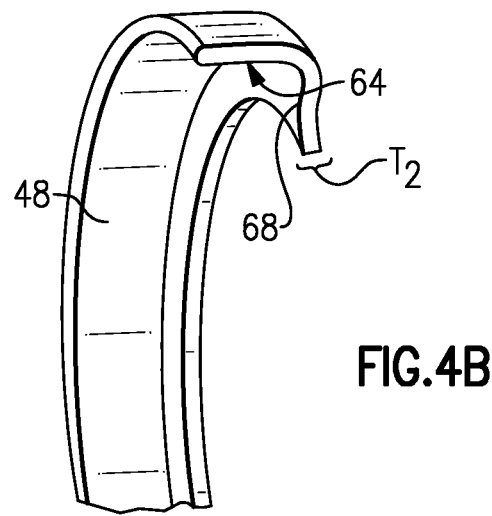
FIG. 4B illustrates another overlay having a larger dimension than the overlay of FIG. 4A.

Because the amount of wear may vary over time and between turbine engine components, a number of overlays of differing sizes may be available for selection by a repair technician so that the overlay may more closely fit in location 100 of damaged area 28. Accordingly, as shown in FIGS. 4A and 4B, a repair technician would have the option of choosing between two or more differently sized overlays, here overlay 40 and overlay 48. Like overlay 40, overlay 48 is shaped in the same way as overlay 40, including having the same first overlay surface 64 and second overlay surface 68, both of which mimic first turbine engine component surface 56 and second engine turbine component surface 60, respectively, as explained. However, second overlay 48 is shown in FIG. 4B as thicker than overlay 40 shown in FIG. 4A. Overlay 40 has thickness $T_1$ while overlay 48 has thickness $T_2$. $T_2$ is greater than $T_1$. Accordingly, if there is significant wear to damaged area 28, overlay 48 may be selected by a repair technician instead of overlay 40.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. A method of repairing a turbine engine, comprising the steps of:
    a) identifying a turbine engine component having a damaged area;
    b) removing a portion of the turbine engine component proximate the damaged area to accommodate an overlay;
    c) placing the overlay in a location previously occupied by the removed portion; and
    d) attaching the overlay to the turbine engine component, wherein the turbine engine component has an original shape prior to having the damaged area, and the overlay has a surface mimicking and conforming generally to at least a portion of the original shape of the turbine engine component, wherein the overlay is a strip of roll-formed material, wherein the overlay includes a first portion extending transversely from a second portion, the first portion having a planar shape, the second portion having a first area with a planar shape and a second area with a curved shape.

2. The method of claim 1, wherein the overlay is selected from a variety of overlays having different dimensions.

3. The method of claim 2, wherein each of the variety of overlays has a surface mimicking at least a portion of the original shape of the turbine engine component.

4. The method of claim 1 wherein the original shape is a shape of a finished outer surface of the turbine engine component prior to the turbine engine component having the damaged area.

5. The method of claim 1, wherein the original shape has a first turbine engine component surface different than a second turbine engine component surface, the overlay having a first overlay surface mimicking the first turbine engine component surface and a second overlay surface mimicking the second turbine engine component surface.

6. The method of claim 1, wherein the turbine engine component comprises a shroud segment of the turbine engine.

7. The method of claim 1, wherein attaching comprises welding the overlay to the turbine engine component.

8. The method of claim 1 wherein attaching comprises brazing the overlay to the turbine engine component.

9. The method of claim 1 wherein attaching comprises adhering the overlay to the turbine engine component.

10. The method of claim 1, wherein the overlay is made of the same material as the turbine engine component.

11. A method of repairing a turbine engine component, comprising the steps of:
    a) identifying a shroud segment having a damaged area;
    b) removing a portion of the shroud segment proximate the damaged area to accommodate an overlay;
    c) placing the overlay in a location previously occupied by the removed portion; and
    d) attaching the overlay to the shroud segment, wherein the shroud segment has an original shape prior to having the damaged area, the overlay having a surface mimicking at least a portion of the original shape of the shroud segment such that machining is not required to conform the surface to the original shape, wherein the overlay includes a first portion extending transversely from the second portion, the first portion including a planar surface area, the second portion including both a curved surface area and a planar surface area separate from the curved surface area.

12. The method of claim 11 wherein the overlay is selected from a variety of overlays having different dimensions.

13. The method of claim 12 wherein each of the variety of overlays has the surface mimicking at least a portion of the original shape of the shroud segment.

14. The method of claim 11, wherein the original shape has a first shroud surface different than a second shroud surface, the overlay having a first overlay surface mimicking the first shroud surface and a second overlay surface mimicking the second shroud surface.

15. The method of claim 11, wherein attaching comprises welding the overlay to the shroud segment.

16. The method of claim 11, wherein attaching comprises brazing the overlay to the shroud segment.

17. The method of claim 11, wherein attaching comprises adhering the overlay to the shroud segment.

18. The method of claim 11, wherein the overlay is made of the same material as the shroud segment.

19. The method of claim 11, wherein the overlay is roll-formed.

* * * * *